F. C. GILFILLAN.
AUTOMATIC PRESSURE REGULATOR.
APPLICATION FILED MAY 24, 1917.

1,311,442.

Patented July 29, 1919.

Inventor
Frederic C. Gilfillan
by Geyer & Topp
Attorneys.

UNITED STATES PATENT OFFICE.

FREDERIC C. GILFILLAN, OF EBENEZER, NEW YORK.

AUTOMATIC PRESSURE-REGULATOR.

1,311,442. Specification of Letters Patent. Patented July 29, 1919.

Application filed May 24, 1917. Serial No. 170,786.

*To all whom it may concern:*

Be it known that I, FREDERIC C. GILFILLAN, a citizen of the United States, residing at Ebenezer, in the county of Erie and State of New York, have invented new and useful Improvements in Automatic Pressure-Regulators, of which the following is a specification.

This invention relates to an automatic pressure regulator which is adapted to maintain the pressure in the pipe or line on the outlet side of the valve at practically a predetermined point regardless of the fluctuations which may exist in the pressure of the fluid on the inlet side of the valve.

It is the object of this invention to provide a regulator of this character which is very sensitive in operation, durable in construction, easily accessible for inspecting, adjusting or cleaning, and which also is so designed that the movement of the diaphragm is multiplied during its transmission to the valve stoppers, so that the stroke of the diaphragm is at no time exhausted and therefore enables the same to always exert full pressure against the valve stoppers for properly controlling the latter.

Figure 1:
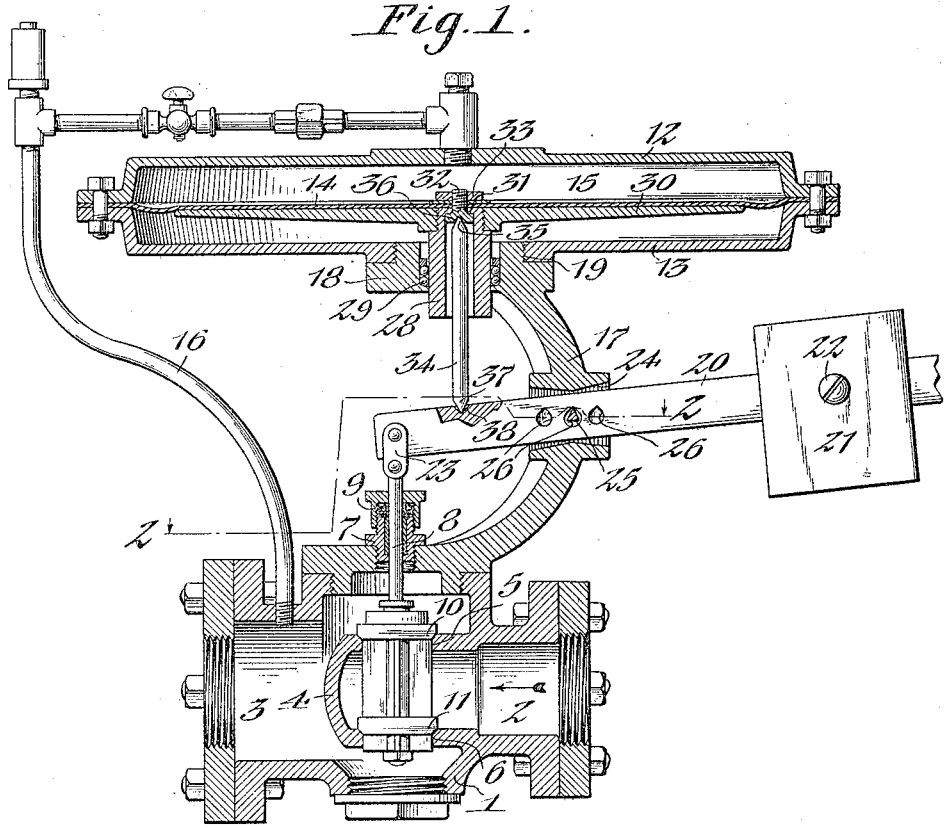
Figure 2:
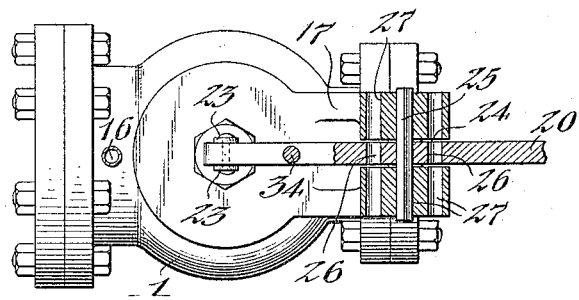

In the accompanying drawings: Figure 1 is a vertical longitudinal section of a pressure regulator embodying my improvements. Fig. 2 is a fragmentary horizontal section of the same taken on line 2—2, Fig. 1.

Similar characters of reference indicate corresponding parts in both figures.

1 represents the body of the valve casing which is provided with a fluid inlet 2 on one side, a fluid outlet 3 on its opposite side and a partition 4 arranged between said inlet and outlet and having upper and lower ports 5, 6 each of which is provided around its upper side with a valve seat. The inlet and outlet of the valve body may be connected with a supply pipe and a delivery pipe in any suitable manner. On its upper side the valve body is provided with an opening in line with the ports which opening is normally closed by means of a cap or head 7 connected therewith by means of a screw joint. 8 represents a valve stem extending through the ports of the partition and a stuffing box 9 in the head 7 and provided with upper and lower valve stoppers 10, 11 which are adapted to move vertically toward and from the seats of the upper and lower ports for the purpose of closing or opening the passageway through the valve.

My improvements relate to the means whereby the movement of the valve stem and its stoppers is automatically controlled by variations in pressure on the outlet side of the valve and in the preferred form of these improvements, as shown in the drawings, they are constructed as follows:

12, 13 represent the upper and lower sections of a dome which is arranged above the valve body and 14 a flexible diaphragm which is arranged at its margin between the opposing marginal edges of the dome sections, this diaphragm and the upper section of the dome together forming a pressure chamber 15. This chamber may be connected with the outlet side of the valve in any suitable manner, for instance as shown in the drawings, by means of a pipe 16 having its upper end connected with the central part of the upper dome section and its lower end with the outlet side of the body of the valve. This dome may be supported in any suitable manner so that the axis or center of its diaphragm is arranged on one side or vertically out of line with the axis of the stem and stoppers of the valve. As shown in the drawings, this dome is supported by means of an upright bracket 17 of substantially C-shape which projects laterally from the head of the valve body and is provided at its upper end with a head 18 which is secured by means of a screw joint 19 in an opening arranged centrally in the lower section of the dome.

20 represents a vertically swing shifting lever which is pivotally mounted on the bracket 17 and has its inner or front arm operatively connected with the diaphragm and also with the valve stem while its outer or rear arm is provided with a weight 21. This weight may be adjusted lengthwise on the outer arm of this lever for varying its effect as desired and the same may be held in its adjusted position by any suitable means, for instance, by a set screw 22 arranged in this weight and engaging with the outer arm of this lever. Various means may also be provided for connecting the inner arm of this lever with the valve stem, the means for this purpose shown in the drawings consisting of a pair of links 23 which are pivotally connected at their upper and lower ends with opposite sides of the lever and the upper end of the valve stem. The preferred means of pivotally mounting or fulcruming the lever on the bracket 17 comprises a longitudinal opening 24 arranged in the central part of the bracket and receiving the lever, this opening flaring in opposite directions from its central part so as to permit of the requisite rocking movement of this lever therein, and a horizontal pivot bearing pin 25 adapted to engage its central part with one or another of a plurality of bearing openings 26 arranged in a longitudinal row in the lever while its opposite ends are adapted to be engaged with one or another pair of bearing openings 27, 27 formed transversely and horizontally in the bracket on opposite sides of its longitudinal opening. By shifting this bearing pin from one set of corresponding openings in the lever and bracket to another the point at which this lever is fulcrumed on the bracket may be varied according to the leverage required for a particular installation. This bearing pin is preferably constructed in the form of a knife blade with its edge pointing upwardly and engaging with the upper side of the respective opening in the lever so that the latter turns with a minimum amount of friction similar to the bearing in a scale and thereby causes this lever to operate very easily and render the working of the valve quick and sensitive. The opposite ends of the bearing pin fit into the openings of the bracket sufficiently tight so that the same will remain in place therein by friction.

The means for operatively connecting the lever with the diaphragm are preferably constructed as follows:

28 represents a vertically movable guide stem which is guided in the central part of the upper head of the bracket preferably by means of an annular ball bearing 29 while its upper end is provided with an external screw thread which engages with an internally screw threaded opening in an equalizing disk 30 engaging with the underside of the diaphragm. This guide stem is hollow or tubular and is open at its lower end while its upper end is provided with an internal downwardly facing shoulder 31. 32 represents the screw threaded body of a coupling bolt which passes through an opening in the upper end of the guide stem 28 and has its head at its lower end arranged within the guide stem and bearing against the shoulder 31 thereof while its screw nut 33 is arranged at its upper end and bears against the upper side of the diaphragm. 34 represents a shifting rod arranged vertically within the guide sleeve and having an upper pointed or conical end 35 which engages with a correspondingly shaped seat 36 in the head of the bolt 32 while the lower end 37 of the same is similarly pointed or of conical form and engages with a correspondingly shaped seat 38 on the upper side of the inner arm of the shifting lever between the fulcrum thereof and its connection with the valve stem. The head of the coupling bolt is preferably hardened and the shifting rod is also hardened so as to reduce to a minimum the wear upon these parts. By constructing the shifting rod with pointed ends and engaging the same with conical seats on the diaphragm and the lever a very sensitive connection is obtained between the diaphragm and this lever which produces a minimum amount of friction and therefore enables the movement of the diaphragm to be transmitted to the valve stoppers promptly and efficiently and without any appreciable loss of power.

By engaging the upper end of the shifting rod with the head of the coupling bolt 32 a pivotal connection is produced between this rod and the diaphragm which is arranged in the plane of the equalizing disk whereby any lateral movement of this rod in response to variations in the position of the shifting lever will not produce any binding or cramping in the connection between the diaphragm and the shifting rod but instead permits these parts to work freely relatively to each other.

By arranging the bracket which connects the valve body and diaphragm chamber and supports the lever on one side of the center of the valve and diaphragm, the connection between the lever, valve stem and diaphragm is rendered easily accessible for inspection, cleaning and repairs. Owing to the arrangement of the diaphragm with its axis on one side of the axis of the valve stem and the connection of the diaphragm with the front arm of the lever between its fulcrum and the valve stem, a certain amount of movement of the diaphragm will be multiplied and cause the valve stoppers to move a greater distance, thereby enabling the valve to be operated quicker and more effectively. Inasmuch, therefore, as the diaphragm has a comparatively short range of movement a multiplication of the same permits of definitely closing the valve stoppers before the movement of the diaphragm is exhausted, thereby causing the full force of the pressure against the diaphragm to be exerted against the valve stoppers for reliably holding the same shut or in a more or less open position and enabling the pressure on the outlet side of the valve to be maintained practically uniform at all times.

I claim as my invention:

1. An automatic pressure regulator comprising a valve body containing an inlet, an outlet and a partition between said inlet and outlet and provided with a port, a valve stem provided with a valve stopper adapted to open and close said port, a pressure chamber communicating with the outlet side of the valve body and having a diaphragm, a shifting lever having an inner arm connected with said valve stem, a weight mounted on the outer arm of said lever, and motion transmitting means interposed between said lever and diaphragm, said means comprising a conical seat arranged centrally on the underside of said diaphragm, and a shifting rod provided with an upper conical end engaging with the seat on said diaphragm and a lower conical end engaging with a conical seat arranged on the inner arm of said lever between its fulcrum and said valve stem.

2. An automatic pressure regulator comprising a valve body containing an inlet, an outlet and a partition between said inlet and outlet and provided with a port, a valve stem provided with a valve stopper adapted to open and close said port, a pressure chamber communicating with the outlet side of the valve body and having a diaphragm, a shifting lever having an inner arm connected with said valve stem, a weight mounted on the outer arm of said lever, and motion transmitting means interposed between said lever and diaphragm, said means comprising a disk engaging the underside of said diaphragm, a tubular guide stem secured to said disk and having an internal downwardly facing shoulder, a bolt extending through said guide stem and having its head bearing against said shoulder and provided with a conical socket and its screw nut engaging with the top of said diaphragm, a guide for said guide stem, and an upright shifting rod arranged in the tubular guide stem and having a conical upper end which engages with the socket of said bolt and provided with a lower conical end which engages with a conical socket in the inner arm of said lever between its fulcrum and said valve stem.

3. An automatic pressure regulator comprising a valve body containing an inlet, an outlet and a partition between said inlet and outlet and provided with a port, a valve stem provided with a valve stopper adapted to open and close said port, a pressure chamber communicating with the outlet side of the valve body and having a diaphragm, a shifting lever having one of its arms operatively connected with said valve stem and diaphragm, a weight arranged on the other arm of said lever, a laterally projecting bracket which connects said valve body and pressure chamber, said bracket being provided with a longitudinal opening which receives said lever and rows of transverse openings on opposite sides of said longitudinal opening and said lever being provided with a longitudinal row of transverse openings, and a transverse pivot pin adapted to be engaged with one or another set of corresponding transverse openings of said bracket and lever.

4. An automatic pressure regulator comprising a valve body containing an inlet, an outlet and a partition between said inlet and outlet and provided with a port, a valve stem provided with a valve stopper adapted to open and close said port, a pressure chamber communicating with the outlet side of the valve body and having a diaphragm, a shifting lever having one of its arms operatively connected with said valve stem and diaphragm, a weight arranged on the other arm of said lever, a laterally projecting bracket which connects said valve body and pressure chamber, said bracket being provided with a longitudinal opening which receives said lever and rows of transverse openings on opposite sides of said longitudinal opening and said lever being provided with a longitudinal row of transverse openings, and a transverse pivot pin adapted to be engaged with one or another set of corresponding transverse openings of said bracket and lever and provided with an upwardly projecting knife edge engaging with the upper sides of said openings.

FREDERIC C. GILFILLAN.